US011937265B2

United States Patent
Farag et al.

(10) Patent No.: US 11,937,265 B2
(45) Date of Patent: Mar. 19, 2024

(54) PRE-INDICATION OF SIDELINK TRANSMISSION INTENTION

(71) Applicant: Samsung Electronics Co., Ltd., Suwon-si (KR)

(72) Inventors: Emad N. Farag, Flanders, NJ (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/932,660

(22) Filed: Sep. 15, 2022

(65) Prior Publication Data
US 2023/0016908 A1    Jan. 19, 2023

Related U.S. Application Data

(63) Continuation of application No. 17/139,908, filed on Dec. 31, 2020, now Pat. No. 11,457,469.

(60) Provisional application No. 63/062,087, filed on Aug. 6, 2020, provisional application No. 62/957,865, filed on Jan. 7, 2020.

(51) Int. Cl.
*H04W 72/23*    (2023.01)
(52) U.S. Cl.
CPC ................................. *H04W 72/23* (2023.01)
(58) Field of Classification Search
None
See application file for complete search history.

(56) References Cited

U.S. PATENT DOCUMENTS

| | | | |
|---|---|---|---|
| 1,912,553 A | 6/1933 | Joshua | |
| 10,716,154 B2 | 7/2020 | Feng | |
| 11,277,229 B2 | 3/2022 | Lee et al. | |
| 11,570,757 B2 * | 1/2023 | Panteleev | H04W 40/246 |
| 11,570,797 B2 * | 1/2023 | Li | H04W 72/23 |
| 2017/0127405 A1 | 5/2017 | Agiwal et al. | |
| 2017/0325214 A1 | 11/2017 | Lu et al. | |
| 2017/0367087 A1 | 12/2017 | Seo | |
| 2019/0082459 A1 | 3/2019 | Faurie et al. | |

(Continued)

FOREIGN PATENT DOCUMENTS

WO    2021027510 A1    2/2021

OTHER PUBLICATIONS

"5G; NR; Physical channels and modulation (3GPP TS 38.211 version 16.3.0 Release 16)", ETSI TS 138 211 V16.3.0, Nov. 2020, 136 pages.

(Continued)

*Primary Examiner* — Hong S Cho

(57) ABSTRACT

A user equipment (UE) indicates an intent to transmit on sidelink sub-channels using a transmission indication and then monitors receptions of transmission grants transmitted from one or more other devices, such as UEs or base stations, and determines whether or not to proceed with the sidelink transmission on the sub-channels based on the received transmission grants. A device monitors transmission indications transmitted from UEs to determine a UE (Continued)

that can proceed with a sidelink transmission on sub-channels, and transmits a transmission grant corresponding to the UE that can proceed with the sidelink transmission on sub-channels.

18 Claims, 15 Drawing Sheets

(56) References Cited

U.S. PATENT DOCUMENTS

2019/0306923 A1* 10/2019 Xiong ................. H04J 13/0062
2022/0360371 A1* 11/2022 Ji .......................... H04L 1/1819

OTHER PUBLICATIONS

"5G; NR; Multiplexing and channel coding (3GPP TS 38.212 version 16.3.0 Release 16)", ETSI TS 138 212 V16.3.0, Nov. 2020, 155 pages.
"3rd Generation Partnership Project; Technical Specification Group Radio Access Network; NR; Physical layer procedures for control (Release 16)", 3GPP TS 38.213 V16.3.0, Sep. 2020 179 pages.
"3rd Generation Partnership Project; Technical Specification Group Radio Access Network; NR; Physical layer procedures for data (Release 16)", 3GPP TS 38.214 V16.3.0, Sep. 2020 166 pages.
"5G; NR; Medium Access Control (MAC) protocol specification (3GPP TS 38.321 version 16.2.1 Release 16)", ETSI TS 138 321 V16, Nov. 2020, 156 pages.
"5G; NR; Radio Resource Control (RRC); Protocol specification (3GPP TS 38.331 version 16.2.0 Release 16)", ETSI TS 138 331 V16 2.0, Nov. 2020, 908 pages.
Zte et al., "Mode 2 resource allocation schemes on sidelink", R1-1912553, 3GPP TSG RAN WG1 #99, Reno, Nevada, US, Nov. 18-22, 2019, 12 pages.
International Search Report of the International Searching Authority in connection with International Application No. PCT/KR2021/000183 dated Apr. 19, 2021, 4 pages.
Extended European Search Report dated Jan. 5, 2023 regarding Application No. 21738844.6, 12 pages.
Nokia et al., "On resource control/selection with sensing", 3GPP TSG RAN WG1 Meeting #84bis, R1-163202, Apr. 2016, 7 pages.
Intel Corporation, "Summary#4 for AI 7.2.4.2.2 Mode-2 Resource Allocation", 3GPP TSG RAN WG1 Meeting #99, R1-1913569, Nov. 2019, 46 pages.

* cited by examiner

PRE-INDICATION OF SIDELINK TRANSMISSION INTENTION

CROSS-REFERENCE TO RELATED APPLICATION AND CLAIM OF PRIORITY

This application is a continuation of U.S. patent application Ser. No. 17/139,908, filed on Dec. 31, 2020, which claims priority under 35 U.S.C. § 119(e) to U.S. Provisional Patent Application No. 62/957,865 filed Jan. 7, 2020 and U.S. Provisional Patent Application No. 63/062,087 filed Aug. 6, 2020. The above-identified patent documents are incorporated herein by reference.

TECHNICAL FIELD

The present disclosure relates generally to sidelink transmissions between user equipments and, more specifically, to avoiding potential collisions of sidelink transmissions by multiple user equipments.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of 4G communication systems, and to enable various vertical applications, 5G communication systems have been developed and are currently being deployed.

The 5G communication system is considered to be implemented to include higher frequency (millimeter wavelength or "mmWave") bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

SUMMARY

The present disclosure relates to enabling a user equipment (UE) to indicate an intent to transmit on sidelink (SL) sub-channels using a transmission indication (TI) and then monitoring, in response to the TI transmission, receptions of transmission grants (TGs) that are transmitted from one or more other UEs, and determining, based on the received TGs, whether or not to proceed with the SL transmission on the sub-channels. The present disclosure also relates to enabling a user equipment to monitor TIs that are transmitted from other UEs, to determine a UE that can proceed with a SL transmission on sub-channels, and to transmit a TG corresponding to the UE that can proceed with the SL transmission on the sub-channels.

A UE selects SL resources within a set of SL resources and transmits an indication of the selected SL resources. In response to the transmission of the indication, the UE receives a grant for transmission on the selected SL resources and uses the grant to determine whether or not to transmit in the selected SL resources. The transmitted indication preferably provides an identifier for the UE and for the selected SL resources. The grant preferably includes an identifier for a UE and for selected SL resources. The UE may transmit the indication using a first channel or signal configured for providing the indication. The UE may receive the grant on a second channel or signal configured for providing the grant. A UE determines a priority value for transmission on the selected SL resources, and transmission on the selected SL resources is based on the priority value. The grant may provide an indication for a prioritization of the selected SL resources, and the prioritization may be based on at least one of a priority configuration, a resource index for the selected SL resources, a resource size of the selected SL resources, and a maximum number of UEs that can concurrently transmit on SL sub-channels that include the selected SL resources. The UE may transmit the indication within one of predefined resources in a first slot, and may receive the grant in one of: the first slot, wherein a start of the grant reception is separated from an end of the transmission of the indication by a first gap; or in a second slot. Transmission in the selected SL resources may occur in one of: within the first slot, wherein a start of the transmission is separated from an end of the grant reception by a second gap; in the second slot, wherein the start of the transmission is separated from the end of the grant reception by a third gap; or in a third slot. The indication and the grant are applicable to one of: the first slot or multiple slots including the first slot.

A device receives indications of selected SL resources for SL transmission by first UEs, and determines priority values for corresponding second UEs from the first UEs. When the second UEs have overlapping selected SL resources, the device transmits a grant providing a priority value to a UE from the second UEs. Each indication provides an identifier for a UE from the first UEs and for the selected SL resources by the UE from the first UEs. The device may receive the indications on a channel or signal configured to be used by the device for reception of the indications, and the device may transmit the grant on a channel or signal configured to be used by the device for transmission of the grant. Determination of the priority values is based on at least one of a priority configuration for the second UEs, a resource index for the selected SL resources, a resource size of the selected SL resources, and a maximum number of UEs that can concurrently transmit on SL sub-channels that included the selected SL resources. At least one of the indications is preferably received within one of predefined resources in a first slot, and the grant is preferably transmitted in one of: the first slot, wherein a start of the grant transmission is separated from the end of the reception of the at least one indication by a first gap; or in a second slot. The transmission in the selected SL resources occurs in one of: within the first slot, wherein a start of the transmission is separated from an end of the grant by a second gap; in the second slot, wherein the start of the transmission is separated from the end of the grant by a third gap; or in a third slot. The at least one indication and the grant are applicable to one of: the first slot, or multiple slots including the first slot. Either a UE without SL transmission on any of the selected SL resources or a base station may transmit the grant.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items. The term "provide" means signaled, or indicated implicitly or explicitly, or included within the payload of a message or signal.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

The following documents and standards descriptions are hereby incorporated into the present disclosure as if fully set forth herein:
[1] 3GPP TS 38.211 v16.3.0, "NR; Physical channels and modulation."
[2] 3GPP TS 38.212 v16.3.0, "NR; Multiplexing and Channel coding."
[3] 3GPP TS 38.213 v16.3.0, "NR; Physical Layer Procedures for Control."
[4] 3GPP TS 38.214 v16.3.0, "NR; Physical Layer Procedures for Data."
[5] 3GPP TS 38.321 v16.2.1, "NR; Medium Access Control (MAC) protocol specification."
[6] 3GPP TS 38.331 v16.2.0, "NR; Radio Resource Control (RRC) Protocol Specification."

Abbreviations

Figure 1:
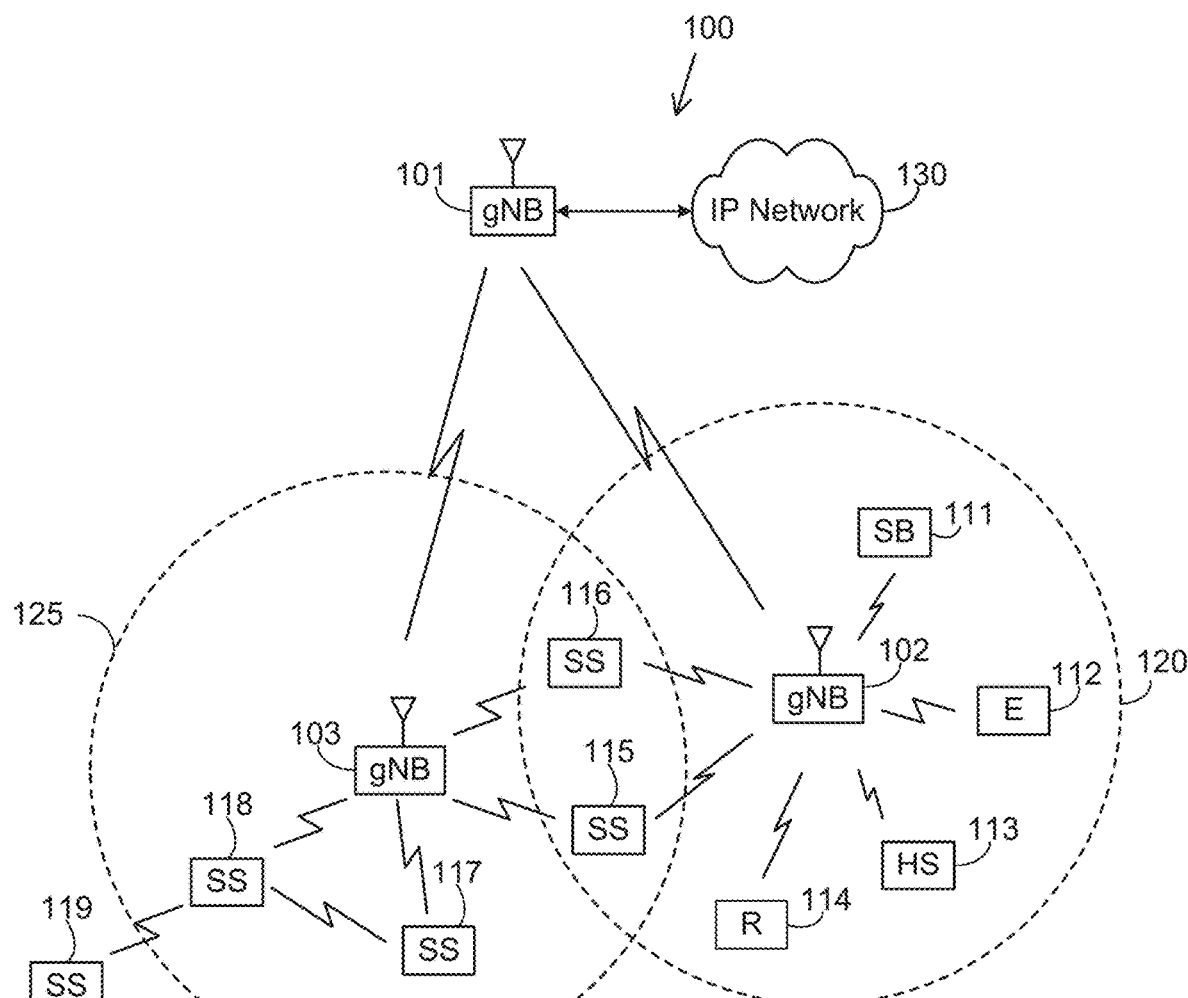
FIG. 1 illustrates an example wireless network according to this disclosure.

ACK acknowledgement
BW bandwidth
BWP bandwidth part
CORESET control resource set
C-RNTI cell radio network temporary identifier
CSI channel state information
CSI-RS channel state information reference signal
DCI downlink control information
DL downlink
DMRS demodulation reference signal
FDD frequency division duplexing
gNB base station (5G NodeB)
HARQ hybrid automatic repeat request
MCS modulation and coding scheme
NR New Radio
PBCH primary broadcast channel
PCell primary cell
PDCCH physical downlink control channel
PDSCH physical downlink shared channel
PSBCH physical sidelink broadcast channel
PSCCH physical sidelink control channel
PSFCH physical sidelink feedback channel
PSSCH physical sidelink shared channel
PUCCH physical uplink control channel
PUSCH physical uplink shared channel
RB resource block
RNTI radio network temporary identifier
RS reference signal
SC sub-carrier
SCell secondary cell
SCI sidelink control information
SFCI sidelink feedback control information
SINR signal to interference and noise ratio
SL sidelink
SRS sounding reference signal
SS synchronization signals
TB transport block
TDD time division duplexing
TPC transmit power control
UCI uplink control information
UE user equipment
UL uplink FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115, the UE 116, UE 117 and UE 118. In some embodiments, one or more of the gNBs 101-103 may communicate with each other and with the UEs 111-118 using 5G, long-term evolution (LTE), LTE-A, WiMAX, or other advanced wireless communication techniques. In some embodiments, multiple UEs, e.g., UE 117, UE 118 and UE 119 may communicate directly with each other through device-2-device communication. In some embodiments, a UE, e.g., UE 119, is outside the coverage area of the network, but can communicate with other UEs inside the coverage area of the network, e.g., UE 118, or outside the coverage area of the network.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks. Furthermore, any number of UEs can communicate directly with each other using device-2-device communications, such UEs can be within network coverage of the same or different gNBs, outside of network coverage, or partially within network coverage where some UEs are within network coverage, while others are outside of network coverage.

Figure 2A:
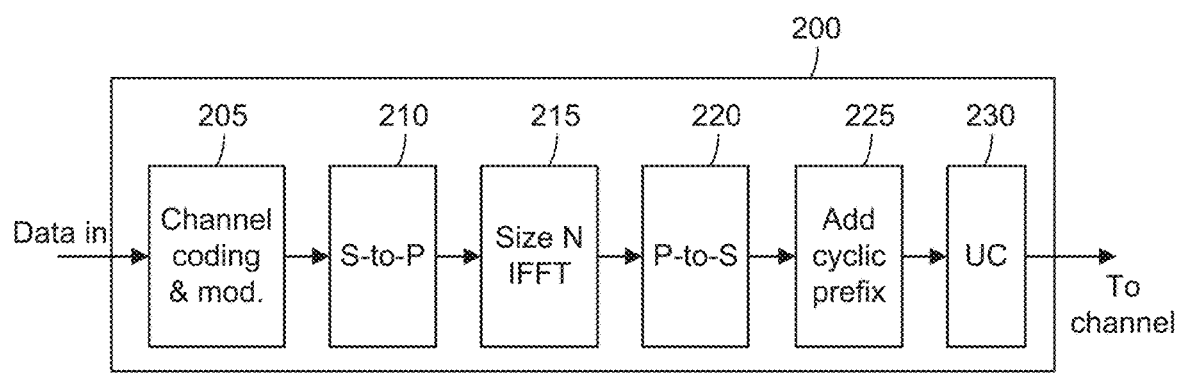
FIGS. 2A and 2B illustrate example wireless transmit and receive paths according to this disclosure.
Figure 2B:
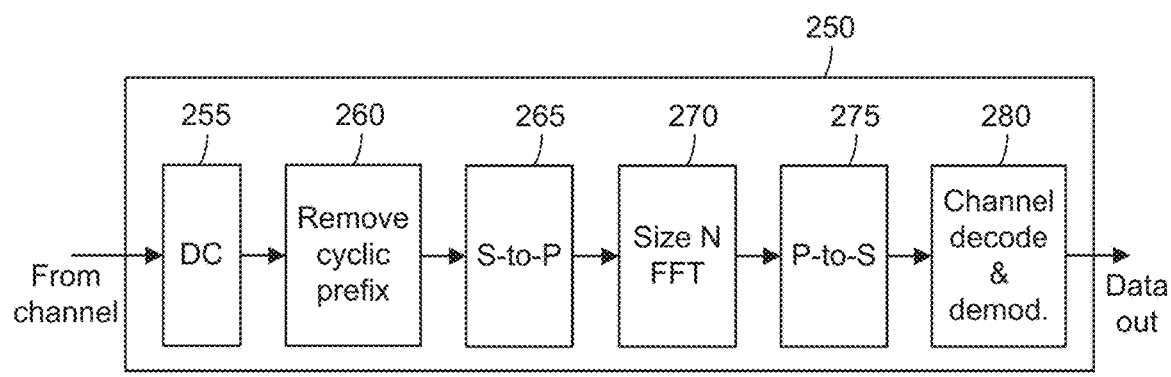

FIGS. 2A and 2B illustrate example wireless transmit and receive paths according to this disclosure. In the following description, a transmit path 200 may be described as being implemented in a gNB (such as gNB 102), while a receive path 250 may be described as being implemented in a UE (such as UE 116). However, it will be understood that the receive path 250 can be implemented in a gNB and that the transmit path 200 can be implemented in a UE. Furthermore, it will be understood that the receive path 250 can be implemented in one UE, and that the transmit path 200 can be implemented in another UE in case of device-2-device (D2D) communication. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to a radio frequency (RF) frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-118 and may implement a receive path 250 that is analogous to receiving in the uplink from UEs 111-118. Similarly, each of UEs 111-118 may implement a transmit path 200 for transmitting in the uplink to gNBs 101-103 and may implement a receive path 250 for receiving in the downlink from gNBs 101-103. Furthermore, each of UEs 111-119 may implement a transmit path 200 for transmitting in the sidelink to another one of UEs 111-119 and may implement a receive path 250 for receiving in the sidelink from another one of UEs 111-119.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3:
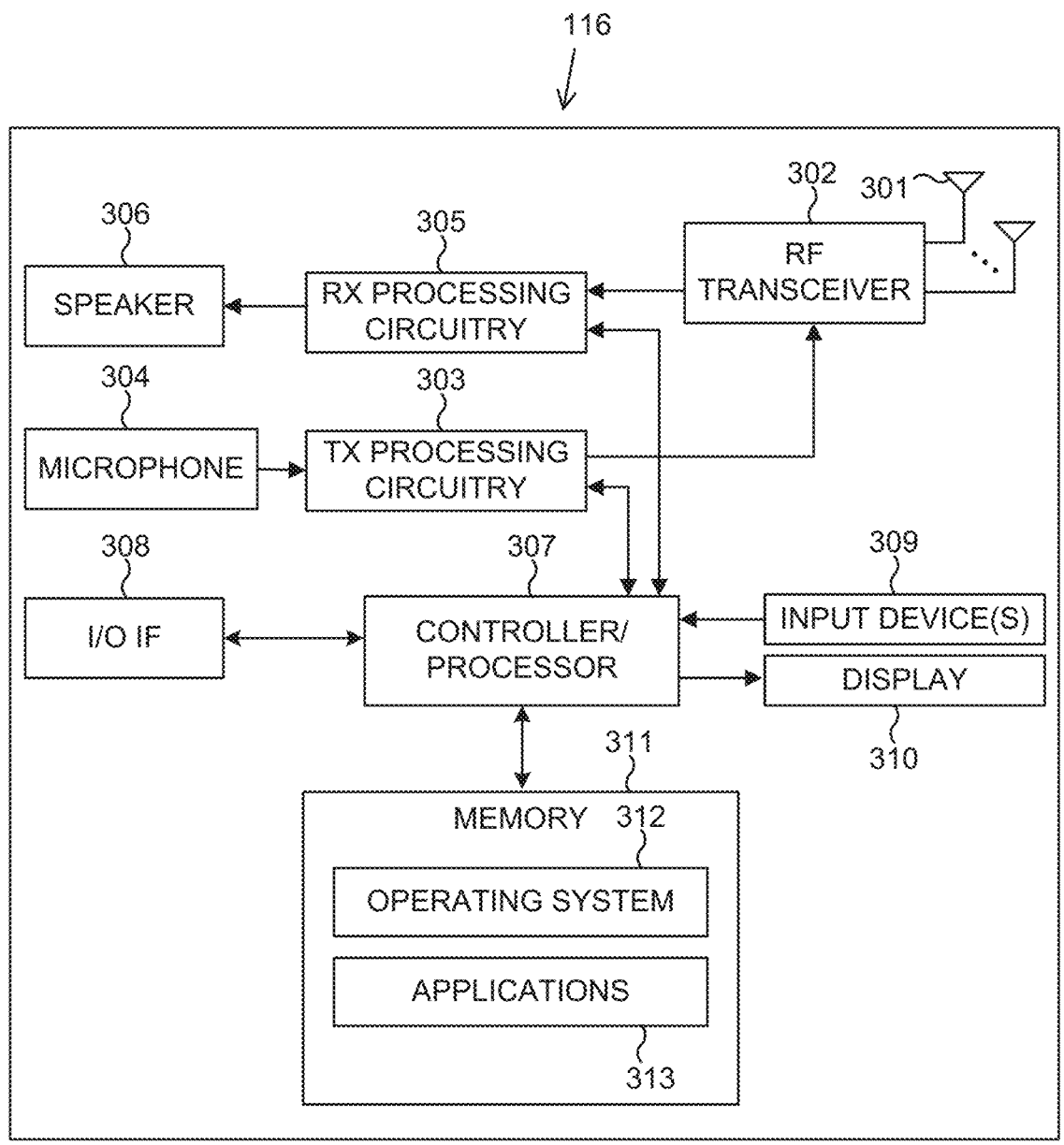
FIG. 3 illustrates an example UE according to this disclosure.

FIG. 3 illustrates an example UE 116 according to this disclosure. The embodiment of the UE 116 illustrated in FIG. 3 is for illustration only, and the UEs 111-115, 117-119 of FIG. 1 can have the same or similar configuration. However, UEs come in a wide variety of configurations, and FIG. 3 does not limit the scope of this disclosure to any particular implementation of a UE.

The UE 116 includes an antenna 301, a radio frequency (RF) transceiver 302, transmit (TX) processing circuitry 303, a microphone 304, and receive (RX) processing circuitry 305. The UE 116 also includes a speaker 306, a main processor 307, an input/output (I/O) interface (IF) 308, a keypad 309, a display 310, and a memory 311. The memory 311 includes a basic operating system (OS) program 312 and one or more applications 313.

The RF transceiver 302 receives, from the antenna 301, an incoming RF signal transmitted by an gNB of the network 100, or transmitted by another UE in case of device-2-device communication. The RF transceiver 302 down-converts the incoming RF signal to generate an intermediate frequency (IF) or baseband signal. The IF or baseband signal is sent to the RX processing circuitry 305, which generates a processed baseband signal by filtering, decoding, and/or digitizing the baseband or IF signal. The RX processing circuitry 305 transmits the processed baseband signal to the speaker 306 (such as for voice data) or to the main processor 307 for further processing (such as for web browsing data).

The TX processing circuitry 303 receives analog or digital voice data from the microphone 304 or other outgoing baseband data (such as web data, e-mail, or interactive video game data) from the main processor 307. The TX processing circuitry 303 encodes, multiplexes, and/or digitizes the outgoing baseband data to generate a processed baseband or IF signal. The RF transceiver 302 receives the outgoing processed baseband or IF signal from the TX processing circuitry 303 and up-converts the baseband or IF signal to an RF signal that is transmitted via the antenna 301.

The main processor 307 can include one or more processors or other processing devices and execute the basic OS program 312 stored in the memory 311 in order to control the overall operation of the UE 116. For example, the main processor 307 can control the reception of forward channel signals and the transmission of reverse channel signals, and/or the transmission and the reception of sidelink channel signals by the RF transceiver 302, the RX processing circuitry 305, and the TX processing circuitry 303 in accordance with well-known principles. In some embodiments, the main processor 307 includes at least one microprocessor or microcontroller.

The main processor 307 is also capable of executing other processes and programs resident in the memory 311, such as operations for channel quality measurement and reporting for systems having two dimensional (2D) antenna arrays as described in embodiments of the present disclosure. The main processor 307 can move data into or out of the memory 311 as required by an executing process. In some embodiments, the main processor 307 is configured to execute the applications 313 based on the OS program 312 or in response to signals received from gNBs or an operator. The main processor 307 is also coupled to the I/O interface 308, which provides the UE 116 with the ability to connect to other devices such as laptop computers and handheld computers as well as sensors, cameras, actuators and other devices inside an automobile. The I/O interface 308 is the communication path between these accessories and the main controller 307.

The main processor 307 is also coupled to the input devices (keypad and/or touchscreen) 309 and the display 310. The operator of the UE 116 can use the input devices 309 to enter data into the UE 116. The display 310 may be a liquid crystal display or other display capable of rendering text and/or at least limited graphics, such as from web sites. The memory 311 is coupled to the main processor 307. Part of the memory 311 can include a random access memory (RAM), and another part of the memory 311 can include a Flash memory or other read-only memory (ROM).

Although FIG. 3 illustrates one example of UE 116, various changes may be made to the structure of FIG. 3. For example, various components in FIG. 3 can be combined, further subdivided, or omitted and additional components can be added according to particular needs. As a particular example, the main processor 307 can be divided into multiple processors, such as one or more central processing units (CPUs) and one or more graphics processing units (GPUs). Also, while FIG. 3 illustrates the UE 116 configured as a mobile telephone or smartphone, UEs can be configured to operate as other types of mobile or stationary devices.

Figure 4:
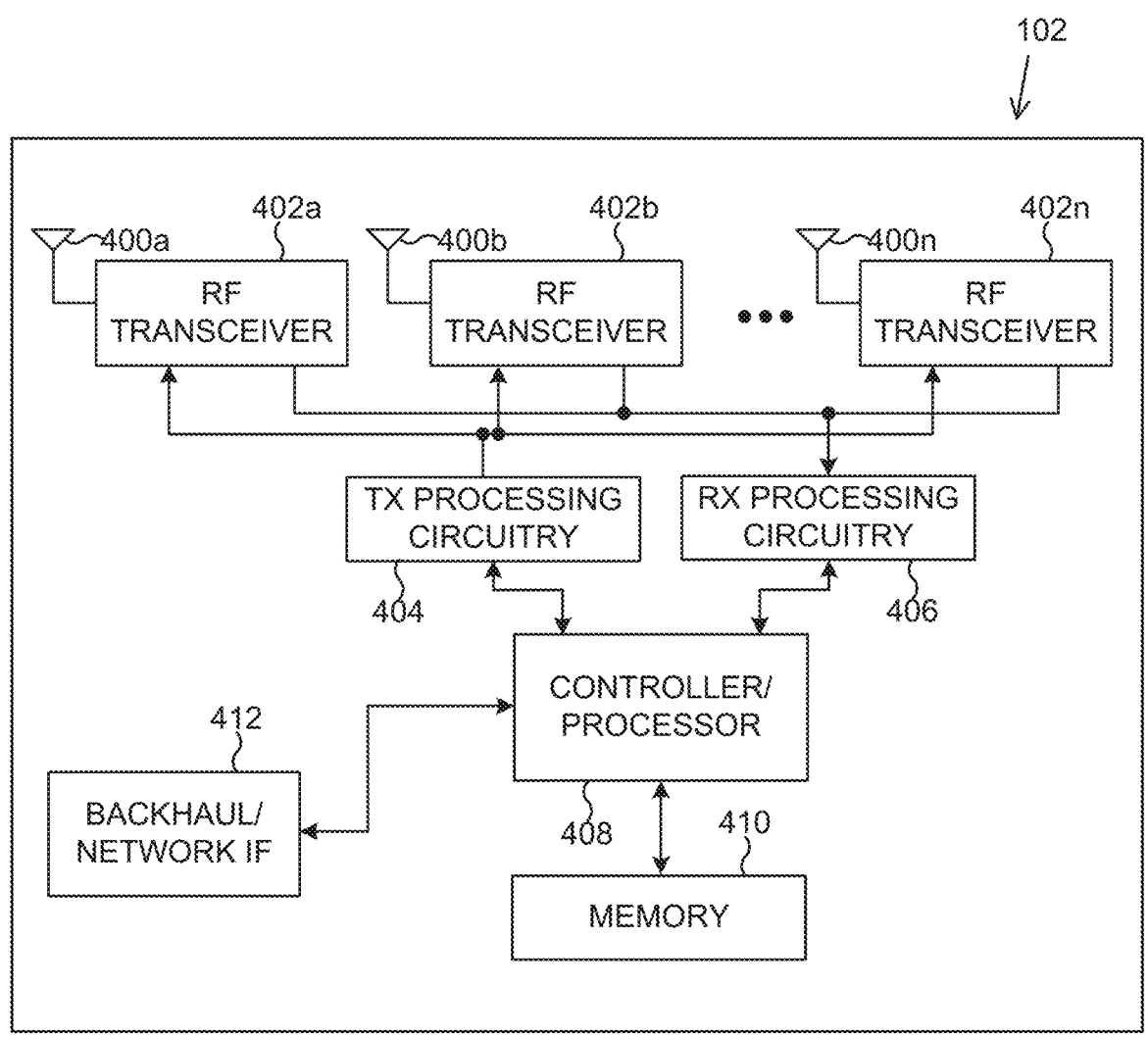
FIG. 4 illustrates an example gNB according to this disclosure.

FIG. 4 illustrates an example gNB 102 according to this disclosure. The embodiment of the gNB 102 shown in FIG. 4 is for illustration only, and other gNBs of FIG. 1 can have the same or similar configuration. However, gNBs come in a wide variety of configurations, and FIG. 4 does not limit the scope of this disclosure to any particular implementation of an gNB. It is noted that gNB 101 and gNB 103 can include the same or similar structure as gNB 102.

As shown in FIG. 4, the gNB 102 includes multiple antennas 400a-400n, multiple RF transceivers 402a-402n, transmit (TX) processing circuitry 404, and receive (RX) processing circuitry 406. In certain embodiments, one or more of the multiple antennas 400a-400n include 2D antenna arrays. The gNB 102 also includes a controller/processor 408, a memory 410, and a backhaul or network interface 412.

The RF transceivers 402a-402n receive, from the antennas 400a-400n, incoming RF signals, such as signals transmitted by UEs or other gNBs. The RF transceivers 402a-402n down-convert the incoming RF signals to generate IF or baseband signals. The IF or baseband signals are sent to the RX processing circuitry 406, which generates processed baseband signals by filtering, decoding, and/or digitizing the baseband or IF signals. The RX processing circuitry 406 transmits the processed baseband signals to the controller/processor 408 for further processing.

The TX processing circuitry 404 receives analog or digital data (such as voice data, web data, e-mail, or interactive video game data) from the controller/processor 408. The TX processing circuitry 404 encodes, multiplexes, and/or digitizes the outgoing baseband data to generate processed baseband or IF signals. The RF transceivers 402a-402n receive the outgoing processed baseband or IF signals from the TX processing circuitry 404 and up-converts the baseband or IF signals to RF signals that are transmitted via the antennas 400a-400n.

The controller/processor 408 can include one or more processors or other processing devices that control the overall operation of the gNB 102. For example, the controller/processor 408 can control the reception of forward channel signals and the transmission of reverse channel signals by the RF transceivers 402a-402n, the RX processing circuitry 406, and the TX processing circuitry 404 in accordance with well-known principles. The controller/processor 408 can support additional functions as well, such as more advanced wireless communication functions. For instance, the controller/processor 408 can perform the blind interference sensing (BIS) process, such as performed by a BIS algorithm, and decodes the received signal subtracted by the interfering signals. Any of a wide variety of other functions can be supported in the gNB 102 by the controller/processor 408. In some embodiments, the controller/processor 408 includes at least one microprocessor or microcontroller.

The controller/processor 408 is also capable of executing programs and other processes resident in the memory 410, such as a basic OS. The controller/processor 408 is also capable of supporting channel quality measurement and reporting for systems having 2D antenna arrays as described in embodiments of the present disclosure. In some embodiments, the controller/processor 408 supports communications between entities, such as web real-time communications (RTC). The controller/processor 408 can move data into or out of the memory 410 as required by an executing process.

The controller/processor 408 is also coupled to the backhaul or network interface 412. The backhaul or network interface 412 allows the gNB 102 to communicate with other devices or systems over a backhaul connection or over a network. The interface 412 can support communications over any suitable wired or wireless connections. For example, when the gNB 102 is implemented as part of a cellular communication system (such as one supporting 5G, LTE, or LTE-A), the interface 412 can allow the gNB 102 to communicate with other gNBs over a wired or wireless backhaul connection. When the gNB 102 is implemented as an access point, the interface 412 can allow the gNB 102 to communicate over a wired or wireless local area network or over a wired or wireless connection to a larger network (such as the Internet). The interface 412 includes any suitable structure supporting communications over a wired or wireless connection, such as an Ethernet or RF transceiver.

The memory 410 is coupled to the controller/processor 408. Part of the memory 410 can include a RAM, and another part of the memory 380 can include a Flash memory or other ROM. In certain embodiments, a plurality of instructions, such as a BIS algorithm is stored in memory. The plurality of instructions is configured to cause the controller/processor 408 to perform the BIS process and to decode a received signal after subtracting out at least one interfering signal determined by the BIS algorithm.

As described in more detail below, the transmit and receive paths of the gNB 102 (implemented using the RF transceivers 402a-402n, TX processing circuitry 404, and/or RX processing circuitry 406) support communication with aggregation of FDD cells and TDD cells.

Although FIG. 4 illustrates one example of an gNB 102, various changes may be made to FIG. 4. For example, the gNB 102 can include any number of each component shown in FIG. 4. As a particular example, an access point can include a number of interfaces 412, and the controller/processor 408 can support routing functions to route data between different network addresses. As another particular example, while shown as including a single instance of TX processing circuitry 404 and a single instance of RX processing circuitry 406, the gNB 102 can include multiple instances of each (such as one per RF transceiver).

A unit for DL signaling, for UL signaling or for SL signaling on a cell is referred to as a slot and can include one or more symbols. A bandwidth (BW) unit is referred to as a resource block (RB). One RB includes a number of subcarriers (SCs). For example, a slot can have duration of one millisecond and an RB can have a bandwidth of 180 kilo-Hertz (KHz) and include 12 SCs with inter-SC spacing of 15 KHz. A slot can be either full DL slot, or full UL slot, or hybrid slot similar to a special subframe in time division duplex (TDD) systems (see also REF 1). In addition, a slot can have symbols for SL communications.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS)—see also REF 1. A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used (see also REF 3). A CSI process consists of NZP CSI-RS and CSI-IM resources. A UE can determine CSI-RS transmission parameters through DL control signaling or higher layer signaling, such as radio resource control (RRC) signaling from a gNB (see also REF 5). Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also REF 1). A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in its buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs. A CSI report from a UE can include a channel quality indicator (CQI) informing a gNB of a largest modulation and coding scheme (MCS) for the UE to detect a data TB with a predetermined block error rate (BLER), such as a 10% BLER (see also REF 3), or a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH, see also REF 3 and REF 4).

SL signals and channels are transmitted and received on sub-channels within a resource pool, where a resource pool is a set of time-frequency resources used for SL transmission and reception within a SL BWP. SL channels include physical SL shared channels (PSSCHs) conveying data information, physical SL control channels (PSCCHs) conveying SL control information (SCI) for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. The SCI can be split into two parts/stages corresponding to two respective SCI formats; the first SCI format is multiplexed on a PSCCH, while the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information to a group of UEs within a (pre-)configured set. In a broadcast mode, a PSCCH/PSSCH conveys SL information to all surrounding UEs. In NR release 16, there are two resource allocation modes for a PSCCH/PSSCH transmission. In resource allocation mode 1, a gNB schedules UEs on the SL and conveys the scheduling information to a UE transmitting on the SL through a DCI format. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a network can configure one of two HARQ feedback options:

HARQ feedback option (1): A UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB.

HARQ feedback option (2): A UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ feedback option (1), when a UE that transmitted the PSSCH detects a NACK in a PSFCH reception, the UE transmits another PSSCH with the TB. In HARQ feedback option (2) when a UE that transmitted the PSSCH does not detect an ACK in a PSFCH reception, such as when the UE detects a NACK or does not detect a PSFCH reception, the UE transmits another PSSCH with the TB.

In resource allocation mode 2, with semi-persistent PSSCH transmissions configured by higher layers, a UE senses the sub-channels of a resource pool before selecting a resource to transmit a PSSCH on one or more sub-channels. The sub-channels are used semi-persistently for subsequent transmission instances according to a periodicity of the semi-persistent PSSCH transmissions. If two or more UEs are configured to transmit at a same time, sense the channel, and find a same set of available sub-channels, it is possible that the UEs select same sub-channels for PSSCH transmission. A collision occurs when first UEs transmit in same sub-channels, that is when two or more PSSCH transmissions from respective two or more UEs interfere by occupying overlapping time-frequency resources. When PSSCH transmissions from first UEs collide in time and frequency, second UEs receiving the PSSCH transmissions from the first UEs will typically not be able to correctly decode corresponding TBs.

Additionally, for half-duplex operation, when first and second UEs transmit at a same time, the first UEs are not able to receive the transmission from the second UE and the reverse as a UE can only receive or transmit at any time instance.

To address the persistent collision problem for PSSCH transmissions configured by higher layers and, due to half-duplex operation, the inability of a second UE to receive a transmission from a first UE when the second UE is transmitting, the first UE can perform another PSSCH transmission for a TB (PSSCH retransmission or HARQ retransmission). If the PSSCH retransmission does not collide with transmissions from other UEs and occurs when the second UE is listening/receiving, there is a large probability that the second UE can correctly receive the TB. Nevertheless, there are at least two problems when relying on HARQ retransmissions to address persistent collisions of PSSCH transmissions or missed PSSCH receptions due to half duplex operation.

First, relying on HARQ retransmissions reduces spectral efficiency and power efficiency.

Second, in case of HARQ feedback option (1), if the second UE cannot detect a SCI format scheduling a PSSCH reception, due to collision or due to half-duplex operation, the second UE would not transmit a PSFCH with NACK information, and the first UE would not be able to know that the second UE did not receive the TB in order for the first UE to transmit another PSSCH with the TB.

One approach to avoid the two previously cited problems is to have a Transmission Indication (TI) of a SL transmission intention. For example, the TI can be a sequence-based signal with short duration, such as 1 symbol. Sequences transmitted from multiple UEs can be multiplexed in a same PRB and in a same symbol, thereby resulting to low overhead. Other UEs with no transmissions can receive the TIs. If a device detects multiple TIs, the device can select one TI based on a predetermined/(pre)-configured rule and transmit a Transmission Grant (TG). For example, the TG can also be a sequence-based signal with short duration, such as 1 symbol, and sequences from multiple devices can be multiplexed in a same PRB and in a same symbol, thereby also resulting to low overhead. If a UE detects only a TG in response to a previous TI transmission by the UE, the UE proceeds with the SL transmission that can include a PSCCH and a PSSCH. If a UE detects multiple TGs, the UE can determine based on a predetermined/(pre)-configured rule whether or not to proceed with the SL transmission that includes a PSCCH and a PSSCH.

Despite a potential for low overhead, such as when using one PRB in one symbol, transmissions of a TI and of a TG can generally result to a large total/system overhead on the SL for example due to time gap requirements between TI/TG transmissions/receptions as is subsequently described.

Figure 5:
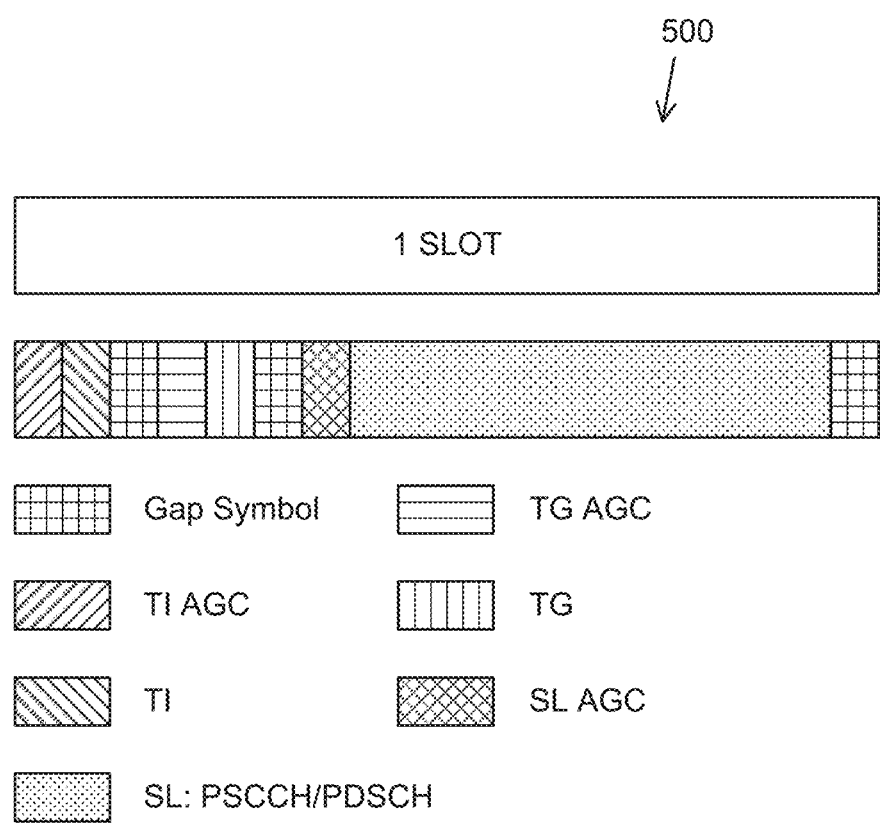
FIG. 5 shows an example allocation for symbols of a slot to TI/TG transmissions and to PSCCH/PSSCH transmissions according to embodiments of the present disclosure.

FIG. 5 shows an example allocation 500 for symbols of a slot to TI/TG transmissions and to PSCCH/PSSCH transmissions according to embodiments of the present disclosure.

A TI reception by a device occupies one symbol with an additional symbol used for automatic gain control (AGC) tuning. Then there is one symbol gap, followed by one symbol for AGC tuning for TG reception by a first UE and one symbol for TG reception. Then, another symbol gap is needed, followed by a symbol for AGC tuning for a transmission of PSCCH/PSSCH, by the transmission of PSCCH/PSSCH, and by a gap symbol at the end of the PSCCH/PSSCH transmission. From FIG. 5, it can be observed that the PSCCH/PSSCH transmission occupies only 6 symbols out of the 14 symbols of a slot. This represents a large system overhead corresponding to 57% of the total SL resources in a slot.

Figure 6:
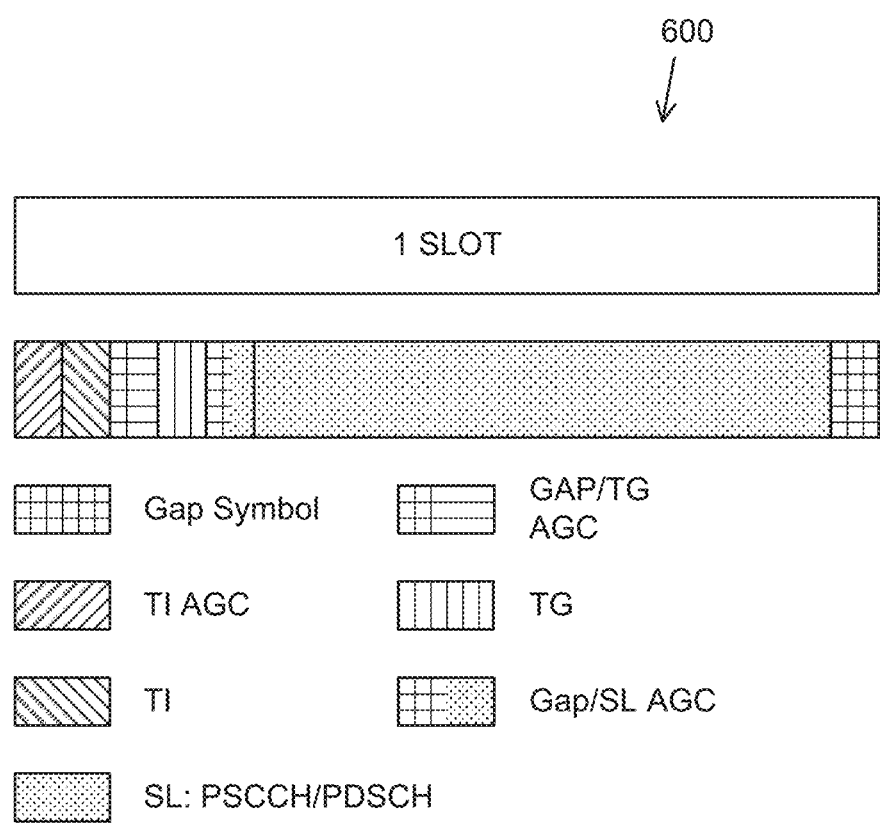
FIG. 6 presents an alternative slot structure where a time for AGC tuning and a time for a switching gap can share a same symbol according to embodiments of the present disclosure.

FIG. 6 presents an alternative slot structure 600 where a time for AGC tuning and a time for a switching gap can share a same symbol according to embodiments of the present disclosure. In a first example of a shared symbol, a first half of a shared symbol can be used for a switching gap and a second half of the shared symbol can be used for AGC tuning for subsequent symbols. In a second example of a shared symbol, symbols used for switching gap of a previous transmission can be absorbed in symbols used for AGC tuning of a subsequent transmission. In a third example, symbols used for switching gap at the end of a slot can be shared with symbols used for AGC tuning at the start of a following slot, where shared symbols can be last symbols of a slot. In a fourth example, symbols used for switching gap at the end of a slot can be shared with symbols used for AGC tuning at the start of a following slot, where shared symbols can be first symbols of a slot. From FIG. 6, it can be observed that the PSCCH/PSSCH transmission occupies 8 symbols out of the 14 symbols of a slot. This represents a system overhead corresponding to 43% of the total SL resources in a slot.

Figure 7:
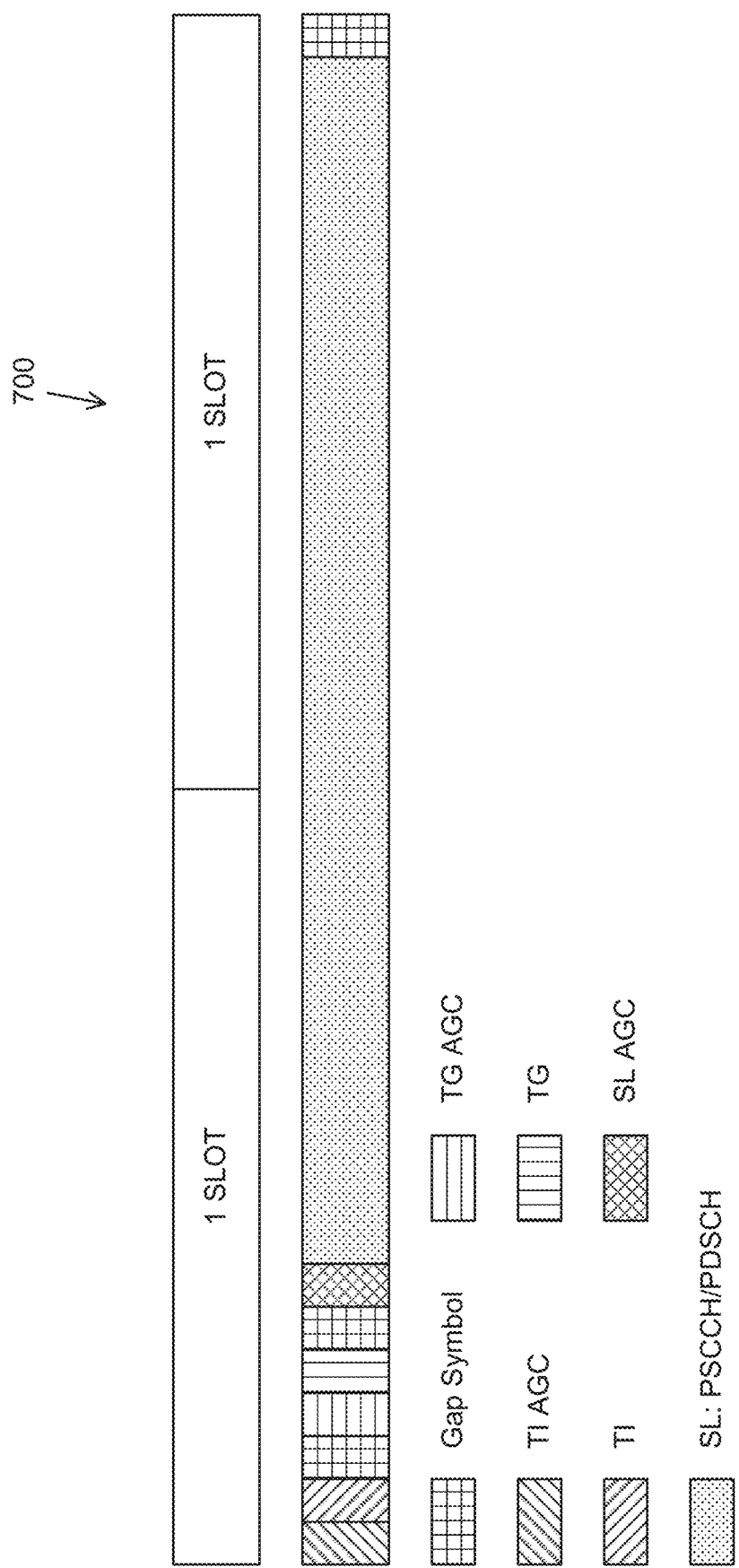
FIG. 7 illustrates an exemplary SL sub-channel allocation over two slots according to embodiments of the present disclosure.

To reduce the total overhead, the SL sub-channel allocation can be over multiple slots. FIG. 7 illustrates an exemplary SL sub-channel allocation 700 over two slots according to embodiments of the present disclosure. In this case, and using FIG. 5 as a reference, the PSCCH/PSSCH transmission is over 20 symbols of 28 symbols, thereby reducing a total overhead from 57% to 29%.

Figure 8:
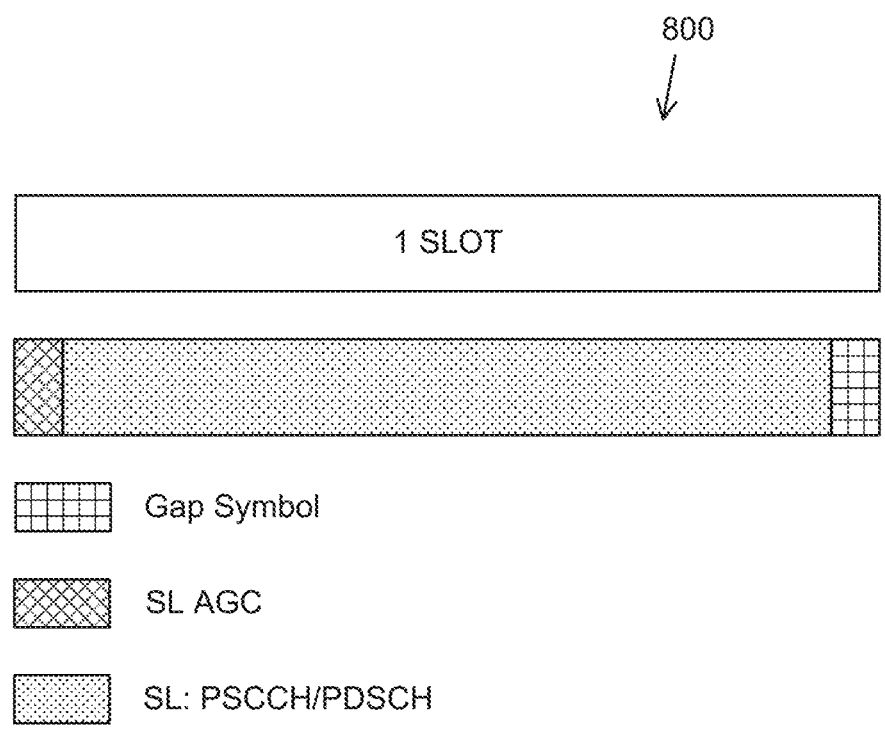
FIG. 8 illustrates a slot structure for a second slot according to embodiments of the present disclosure.

Another approach to reduce a total overhead is to define two slot formats. FIG. 8 illustrates a slot structure 800 for a second slot according to embodiments of the present disclosure. The first slot format can be as in FIG. 5 or FIG. 6. The second slot format, using FIG. 5 as reference for brevity, can be as in FIG. 8. When the SL sub-channel is available, the initial slot of a new SL transmission follows the slot format of FIG. 5. This allows a UE to acquire the sub-channel and resolves any potential contention with other UEs that might have selected the sub-channel. Subsequent transmissions from a same UE can follow the slot format of FIG. 8 and achieve an overhead of only 14%.

Figure 9:
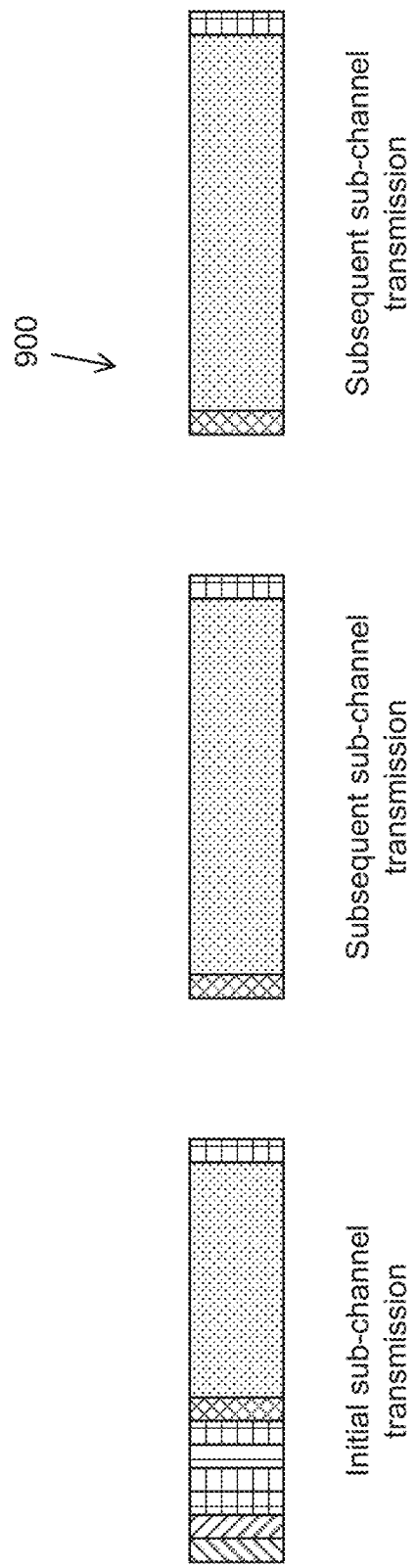
FIG. 9 illustrates an exemplary slot structure where the first SL transmission from a UE uses the slot format of FIG. 5 and subsequent transmissions in a same sub-channel from the UE use the slot format of FIG. 8 according to embodiments of the present disclosure.

FIG. 9 illustrates an exemplary slot structure 900 where the first SL transmission from a UE uses the slot format of FIG. 5 and subsequent transmissions in a same sub-channel from the UE use the slot format of FIG. 8 according to embodiments of the present disclosure. The benefit of using two slot formats in reducing a total overhead is further evident in an example where a UE acquires a sub-channel for a semi-persistent transmission over 10 transmission occasions. The first transmission has a total overhead of 57% in a corresponding slot while the remaining 9 subsequent SL transmissions have a total overhead of 14% in corresponding slots. Hence, an average total overhead is about 19%.

A number of functionalities need to be designed to enable or improve a UE operation to support pre-indication of a SL transmission. In the following, a UE can transmit when the UE has data to transmit, or not-transmit/receive when the UE is listening to/receiving transmissions from other UEs.

Transmitting UE: Transmission of TI when the UE has sensed an available sub-channels and the UE has data to transmit.

Non-transmitting UE: Reception of TIs from other UEs and determination of a UE to grant transmission on the sub-channels through a TG.

Non-transmitting UE: Transmission of the TG corresponding to the UE with granted transmission on the sub-channels.

Transmitting UE: Reception of TGs; if more than one TG is received, determination of whether or not to proceed with a SL transmission on the sub-channels.

One transmitting UE is allowed to proceed with a SL transmission on SL sub-channels.

Subsequent transmissions on the SL sub-channels can use a different slot format that utilizes more symbols in a slot.

A UE can transmit a signal on the SL interface to pre-indicate its intention to transmit on a SL resource. In one example, the UE can transmit the signal in a PSFCH or PSFCH-like channel. In another example, the UE can transmit the signal in a PSCCH. In another example, the UE can transmit the signal in a PSSCH where, for example, a corresponding information can be provided by higher layers, or in another example the corresponding information can be provided as SL control information multiplexed into PSSCH. In another example, the UE can transmit the signal in a newly defined SL physical channel or signal. For example, a newly defined SL signal can be a SL sounding reference signal (SRS). In another example, the UE can transmit the signal using more than one of the previously described channels.

Figure 10A:
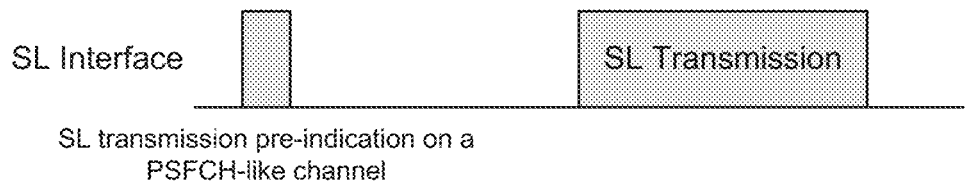
FIG. 10A illustrates a pre-indication channel on a PSFCH-like channel 1000 according to embodiments of the present disclosure.

FIG. 10A illustrates a pre-indication channel on a PSFCH-like channel according to embodiments of the present disclosure.

A UE can transmit a signal on the UL interface (e.g., to a gNB or to an eNB) to pre-indicate its intention to transmit on a SL resource. In one example, the UE can transmit the signal in a PUCCH or PUCCH-like channel, for example in a similar manner as multiplexing a scheduling request in a PUCCH. In another example, the UE can transmit the signal in a PUSCH where, for example, a corresponding information can be provided by higher layers, or in another example the corresponding information can be provided as uplink control information multiplexed in the PUSCH. In another example, the UE can transmit the signal through a PRACH, for example in predetermined resources reserved for a UE to indicate an intention to transmit on a SL resource. In another example, the signal can be a sounding reference signal (SRS) where, for example, the SRS can be additionally modulated with BPSK or QPSK to provide one or two information bits, respectively, to indicate a UE intention. In another example, the UE can transmit the signal in a newly defined UL physical channel. In another example, the UE can transmit the signal using more than one of the previously described channels.

Figure 10B:
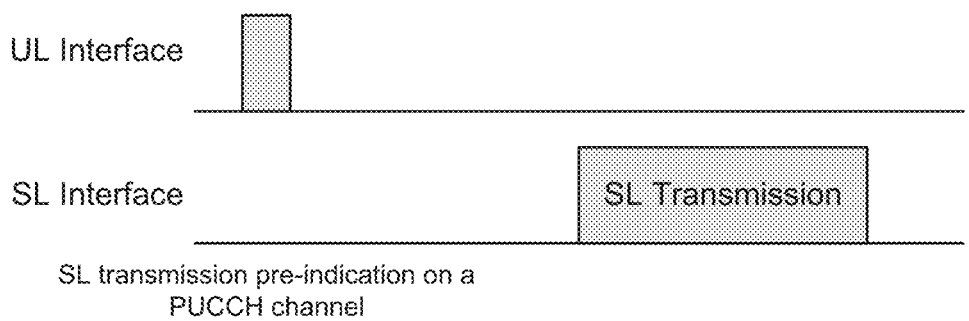
FIG. 10B illustrates a pre-indication channel on a PUCCH channel according to embodiments of the present disclosure.

FIG. 10B illustrates a pre-indication channel on a PUCCH channel according to embodiments of the present disclosure.

A UE can receive a signal on the SL interface to trigger/grant/request the UE to transmit on a SL resource. In one example, the UE can receive the signal in a PSFCH or PSFCH-like channel. In another example, the UE can receive the signal in a PSCCH. In another example, the UE can receive the signal in a PSSCH where, for example, a corresponding information can be provided by higher layers, or in another example the corresponding information can be provided as SL control information multiplexed into PSSCH. In another example, the signal can be transmitted/received in a newly defined SL physical channel or signal. For example, a newly defined SL signal can be a SL sounding reference signal (SRS). In another example, the UE can receive the signal using more than one of the previously described channels.

Figure 10C:
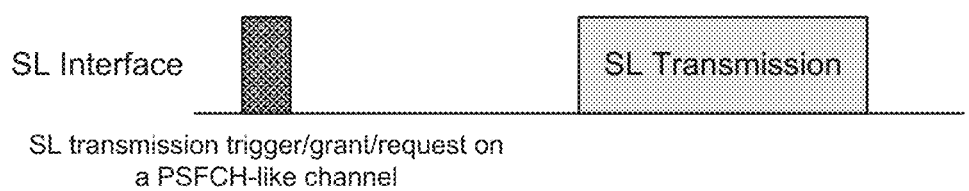
FIG. 10C illustrates a trigger/grant/request channel on a PSFCH-like channel according to embodiments of the present disclosure.

FIG. 10C illustrates a trigger/grant/request channel on a PSFCH-like channel according to embodiments of the present disclosure. In one example, the trigger/grant/request can be in response to a pre-indication.

Figure 10D:
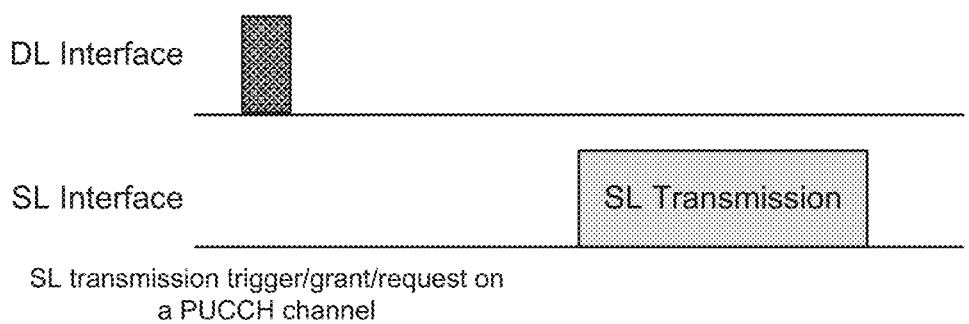
FIG. 10D illustrates a trigger/grant/request channel on a PDCCH according to embodiments of the present disclosure.

A UE can receive a signal on the DL interface (e.g., from a gNB or from an eNB) to trigger/grant/request the UE to transmit on a SL resource. In one example, the UE can receive the signal in a PDCCH where, for example, a corresponding information can be provided by a field in a DCI format included in the PDCCH. In another example, the UE can receive the signal in a PDSCH where, for example, a corresponding information can be provided by higher layers. In another example, the UE can receive the signal in a newly defined DL physical channel or signal. In another example, the UE can receive the signal using more than one of the previously described channels. FIG. 10D illustrates a trigger/grant/request channel on a PDCCH according to embodiments of the present disclosure. In one example, the trigger/grant/request can be in response to a pre-indication.

Figure 11:
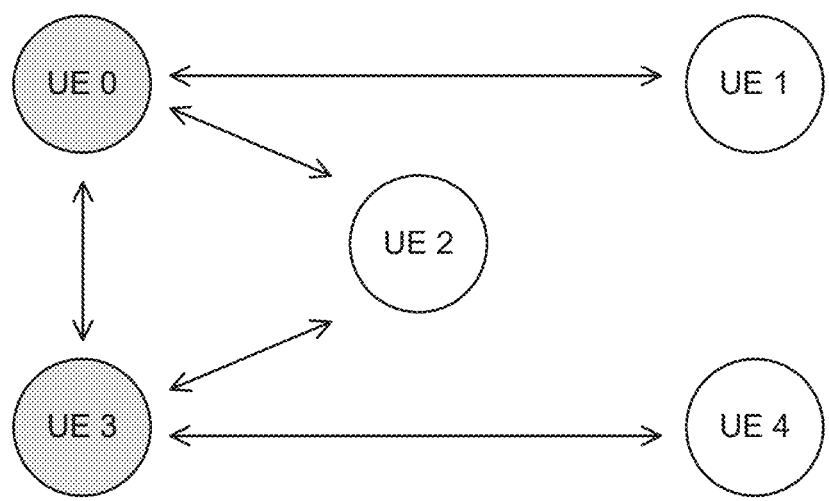
FIG. 11 illustrates SL communication within a group of UEs according to embodiments of the present disclosure.

FIG. 11 illustrates SL communication within a group of UEs according to embodiments of the present disclosure.

In the example shown in FIG. 11, there are five UEs capable of SL communication. The five UEs can transmit and receive in a same resource pool. UE 0 and UE 3 have data to transmit on the SL channel to other UEs and are referred to as transmitting UEs. After sensing the channel for a period of time, or without sensing, UE 0 and UE 3 randomly select an available SL resource. In the example of FIG. 11, UE 0 and UE 3 select a same or overlapping available SL sub-channels/resources for transmission where resources can refer to any combination of time/frequency/code resources. UE 1, UE 2 and UE 4 are referred to as non-transmitting UEs with no data to transmit in the SL sub-channels/resources selected by UE 0 and UE 3.

According to the present disclosure, UE 0 and UE 3 transmit a Transmission Indication (TI) that informs the non-transmitting UEs of a pending SL transmission on selected SL sub-channels/resources. The TI is a unique signal for each {UE, SL sub-channels/resources} pair. For example, the TI can be a sequence that a UE transmits in one or more symbols and in one or more PRBs. A sequence and/or time and/or frequency resources for a TI transmission can be provided to a UE by higher layer signaling from a serving gNB, or from another UE, or can be determined by the UE, from a set of sequence/time/frequency resources, by other means such as a mapping of a UE identity to a resource/element from the set of sequence/time/frequency resources.

According to the example shown in FIG. 11, UE 1, UE 2 and UE 4 are each listening to/receiving transmissions from other UEs, such as UE 3 and UE 0, during a time the TI can be received. UE 1 receives a TI that was transmitted by UE 0. UE 2 receives a TI that was transmitted by UE 0 and a TI that was transmitted by UE 3. UE 4 receives a TI that was transmitted by UE 3. It is assumed that UE 4 is not able to receive the TI from UE 0 and that UE 1 is not able to receive the TI from UE 3.

Each of the non-transmitting UEs receiving a TI decides, in case of multiple TI receptions, a transmitting UE to grant permission to transmit based on the received TIs and based on prioritization rules among TIs. For example, a prioritization rule can be based on a (pre-)configured priority for each UE or on UE IDs and resource indexes of colliding transmissions.

In the example of FIG. 11, as UE 1 only receives the TI from UE 0, UE 1 grants UE 0 permission to transmit. Similarly, as UE 4 only receives the TI from UE 3, UE 4 grants UE 3 permission to transmit. However, UE 2 receives the TIs from both UE 0 and UE 3 and consequently UE 2 needs to prioritize between the two transmissions from UE 0 and UE 3. For example, a simple prioritization rule is for the UE with a lower (UE_ID+Slot_idx) % N to transmit, where UE_ID is a unique user identity, Slot_idx is a slot index, for example within an SFN period, and N is a total number of UEs (five UEs in the example of FIG. 11), and % is the modulo operator, where x % N equals the remainder from the division of x by N. For example, if Slot_idx is 0, UE 0 has higher priority over UE 3, and hence UE 2 grants permission to UE 0 to proceed with SL transmission.

According to the present disclosure, a UE transmits a Transmission Grant (TG) in order to grant permission for a SL transmission to another UE. The TG is a unique signal for each {UE, SL sub-channels/resources} pair. For example, the TG can be a sequence transmitted in one or more symbols in one or more PRBs. Each UE is allocated a different sequence and/or time and/or frequency resources. There is a one-to-one correspondence between the signal of the TI and the signal of the TG.

After transmitting a TI, a UE listens/attempts to receive TGs during a time a corresponding TG can be transmitted by another UE. The UE can detect one or more TGs.

- If a UE does not detect a TG corresponding to a TI that the UE previously transmitted, the UE cancels its SL transmission. The UE repeats the SL transmission resource selection.
- If the UE only detects a TG corresponding to a TI that the UE previously transmitted, the UE can proceed with SL transmission in the resources corresponding to the TG.
- If the UE detects a TG corresponding to a TI that the UE previously transmitted and also detects one or more TGs corresponding to one or more TIs that were not transmitted by the UE for same or overlapping SL sub-channels/resources, the UE determines whether or not the UE can proceed with SL transmission based on prioritization rules. The prioritization rules are same as the ones used by the non-transmitting UEs to determine the TGs. If the UE determines that the UE has lower priority according to the prioritization rules, the UE cancels its SL transmission and repeats the SL transmission resource selection; otherwise, if the UE determines that the UE has higher priority, the UE proceeds with its SL transmission in the resources corresponding to the TG.

In the example of FIG. 11, UE 0 receives a TG from UE 1 and a TG from UE 2 while UE 0 cannot receive/detect transmission TG from UE 4, hence UE 0 decides that UE 0 can proceed with its SL transmission. However, UE 3 receives from UE 2 a TG corresponding to UE 0 and receives from UE 4 a TG corresponding to UE 3, while UE 3 cannot receive/detect transmission TG from UE 1. UE 3 uses a same prioritization rule as used by other UEs to determine corresponding TGs. In this example, the prioritization rule is to allow a UE with a lower (UE_ID+Slot_idx) % N to transmit, where UE_ID is a unique user identity, Slot_idx is a slot index, for example within an SFN period and N is a total number of UEs and, in the example of FIG. 11, N=5, and % is the modulo operator, where x % N equals the remainder from the division of x by N. For example, if Slot_idx is 0, UE 0 has priority over UE 3, and hence UE 3 does not proceed with its SL transmission.

When UE 0 proceeds with SL transmission, no other UE transmits on the selected sub-channels/resources. All other UEs, including UE 3, can receive the sidelink transmission of UE 0.

Figure 12:
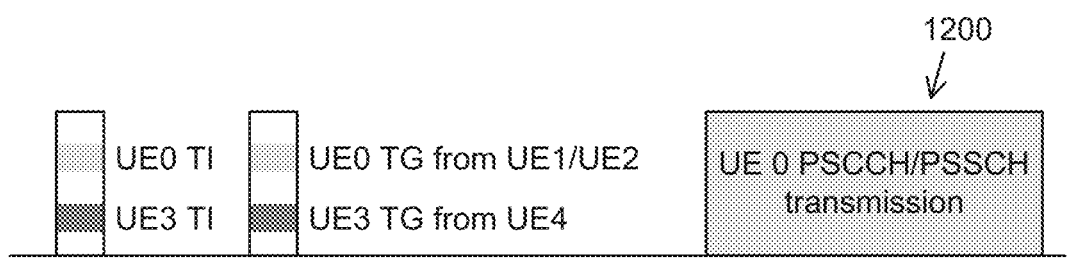
FIG. 12 is a further illustration based on the example of FIG. 11.

FIG. 12 is a further illustration based on the example of FIG. 11, where TI transmitting UEs indicate a potential SL transmission in available SL sub-channels/resources. The signal transmitted during the TI can be unique for a {UE, SL sub-channels/resources} pair. Other UEs, not transmitting in the selected sub-channels/resources, transmit respective TGs to grant transmitting UEs permission to transmit based on received TIs and a prioritization rule. Based on the TGs received by the transmitting UEs in response to TI transmission, each transmitting UE can decide whether to proceed with a SL transmission, or to cancel the SL transmission and preform a new SL transmission resource selection.

Figure 13:
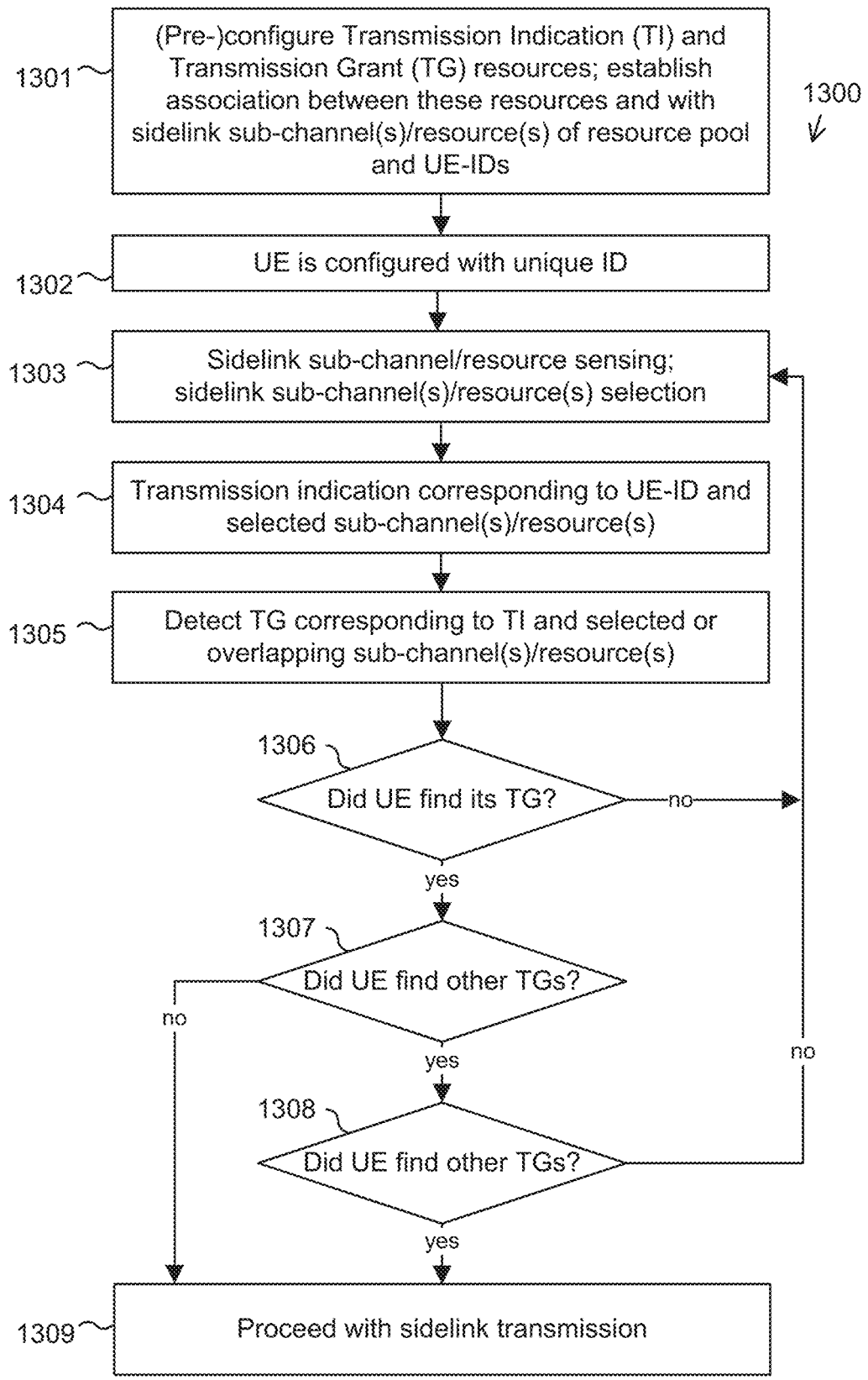
FIG. 13 illustrates a procedure for a UE to select SL sub-channels/resources for sidelink transmissions according to embodiment of the present disclosure.

FIG. 13 illustrates a procedure for a UE to select SL sub-channels/resources for SL transmissions according to embodiment of the present disclosure.

In step 1301, the TIs and TGs are (pre-)configured and are unique for each UE ID and each SL sub-channel/resource within a resource pool.

In step 1302, a UE is configured with a unique ID that determines a TI and a TG associated with the UE. The UE ID can be assigned/de-assigned in a dynamic manner as the UEs are added or removed from the set of UEs that can communicate on a SL channel using the resource pool.

In step 1303, a UE with data to transmit can perform sub-channel/resource sensing to determine available sub-channels/resources of a resource pool. The UE selects available SL sub-channel/resource within the resource pool for a potential SL transmission.

In step 1304, the UE transmits a TI corresponding to the UE-ID and selected SL sub-channels/resources.

In step 1305, the UE attempts to receive and detect the TG corresponding to the TI that the UE transmitted in step 1304. Furthermore, the UE attempts to receive and detect TGs from other UEs for the selected or overlapping SL sub-channels/resources.

In step 1306, the UE determines if the UE has detected a TG corresponding to the TI transmission by the UE. If the UE has not detected the TG, the UE continues with step 1303. If the UE has detected the TG, the UE proceeds to step 1307.

In step 1307, the UE determines if the UE has detected TGs for other UEs associated with a same selected or overlapping SL sub-channels/resources. If not, the UE proceeds to step 1309 for SL transmission on the selected sub-channels/resources. If the UE detects TGs for other UEs, the UE proceeds to step 1308.

In step 1308, the UE determines a TG, from the detected TGs for the selected or overlapping SL sub-channels/resources, with the highest priority. If a detected TG for another UE has a higher priority, the UE continues with step 1303. If a detected TG with the highest priority is the TG for the UE, the UE proceeds to step 1309 for SL transmission on the selected sub-channels/resources.

In step 1309, the UE performs SL transmission on the selected SL sub-channels/resources.

In step 1303 of FIG. 13, the UE may not perform sensing of sub-channels/resources and the UE can perform random resource selection and/or resource selection based on (pre-)configured resource selection criteria.

Figure 14:
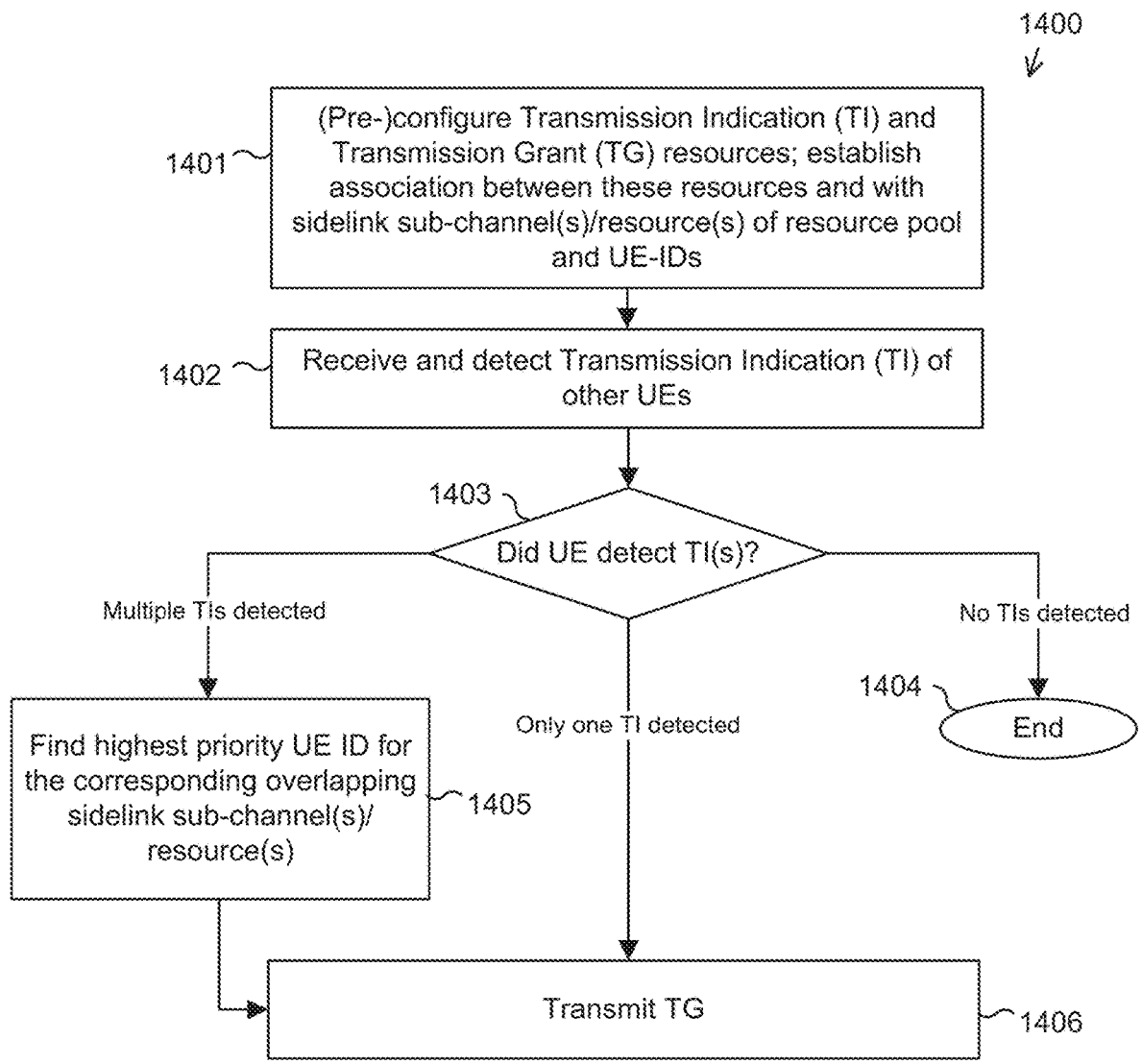
FIG. 14 illustrates a procedure for a UE to receive and detect one or more TIs corresponding to SL sub-channels/resources and to transmit corresponding TGs according to embodiments of the present disclosure.

FIG. 14 illustrates a procedure for a UE to receive and detect one or more TIs corresponding to SL sub-channels/resources and to transmit corresponding TGs according to embodiments of the present disclosure.

In step 1401, a UE is (pre-)configured TIs and TGs. The TIs and the TGs can be unique for each UE ID, with a SL transmission, and for each SL sub-channels/resources within a resource pool.

In step 1402, the UE attempts to receive and detect TIs transmitted from other UEs for a SL sub-channels/resources where the UE has no ongoing or pending transmission.

In step 1403, the UE determines if the UE has detected any TIs. If the UE has not detected any TI, the UE proceeds to step 1404 and the procedure ends. If the UE has detected only one TI, the proceeds to step 1406 to transmit a TG corresponding to the one TI. If the UE has detected multiple TIs, the UE proceeds to step 1405.

In step 1405, the UE determines a UE ID with the highest priority for corresponding overlapping SL sub-channels/resources and proceeds to step 1406 to transmit a corresponding TG.

In step 1406, the UE transmits the TG for the highest priority UE-ID with a detected TI for the corresponding overlapping SL sub-channels/resources.

In FIG. 14 a single UE within a group of UEs can detect the TIs of other UEs, can determine a highest priority UE among a group of UEs with a same or overlapping SL sub-channels/resources, and can transmit a corresponding TG to a highest priority UE.

In step 1308 of FIG. 13 and in step 1405 of FIG. 14, the respective UEs determine the highest priority UE ID among a plurality of UEs selecting the same or overlapping SL sub-channels/resources for transmission.

A network can (pre-)configure a priority for each UE ID and the UE in step 1308 of FIG. 13, or the UE in step 1405 of FIG. 14, determines the highest UE ID among a plurality of UE IDs with the highest network (pre-)configured priority and selects a same or overlapping SL sub-channels/resources for transmission.

The UE in step 1308 of FIG. 13, or the UE in step 1405 of FIG. 14, can determine the highest UE ID among a plurality of UEs selecting a same or overlapping SL sub-channels/resources for transmission based on a SL sub-channels/resources time and/or frequency resource index.

The UE in step 1308 of FIG. 13, or the UE in step 1405 of FIG. 14, can determine the highest UE ID among a plurality of UEs selecting a same or overlapping SL sub-channels/resources for transmission based on the resource allocation size of the SL transmission. For example, a SL transmission can have priority over another overlapping SL transmission with a smaller resource allocation size.

The UE in step 1308 of FIG. 13, or the UE in step 1405 of FIG. 14, can determine the highest UE ID among a plurality of UEs selecting a same or overlapping SL sub-channels/resources for transmission based on the total number of UEs that are allowed to proceed with SL transmissions. For example, if multiple UEs have partially overlapping SL transmissions, the prioritization rule maximizes the number of non-overlapping SL transmissions.

Figure 15:
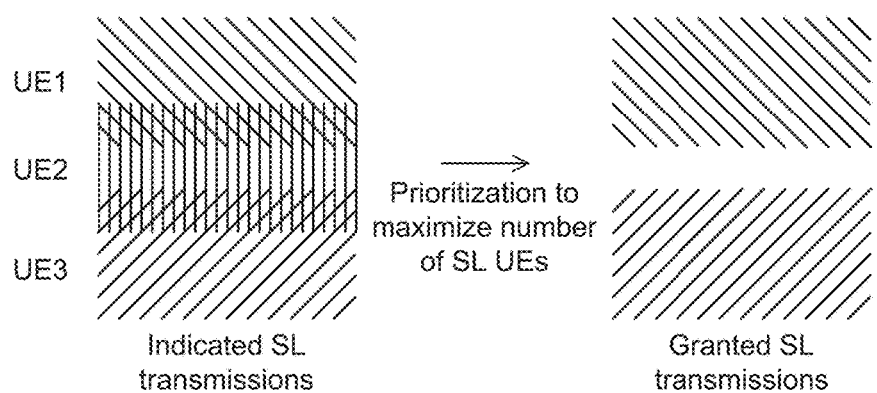
FIG. 15 illustrates an example with 3 partially overlapping SL transmissions according to embodiments of the present disclosure.

FIG. 15 illustrates an example with 3 partially overlapping SL transmissions according to embodiments of the present disclosure, the prioritization rule is to maximize the number of SL transmissions, accordingly UE 1 and UE 3 are granted permission to transmit.

The UE in step 1308 of FIG. 13, or the UE in step 1405 of FIG. 14, can determine the highest UE ID among a plurality of UEs selecting a same or overlapping SL sub-channels/resources for transmission based on multiple ordered-criteria, in case of a tie in one criterion, the next criterion is considered to break the tie.

A SL sub-channels/resources time and/or frequency resource index can be slot index. For example, the slot index can be the slot index within a radio frame with a predetermined number of slots or within a SFN period with a predetermined number of frames or slots. For example, the UE with highest priority is a UE with a lower (UE_ID+slot_Idx) % N, where N is a number of UEs using a SL resource pool and % is the modulo operator, where x % N equals the remainder from the division of x by N.

A UE prioritization rule can provide unbiased UE selection for UEs with same network (pre-)configured priority. Unbiased selection is that all UEs have equal likelihood to be selected for transmission. For example, a prioritization rule can be based on the lowest value of the following equation:

$$(\text{floor}(slot\_idx/2)+((slot\_idx+1)\%2)*UE\_ID-(slot\_idx\%2)*UE\_ID)\%N$$

where N is a total number of UEs, and % is the modulo operator, where x % N equals the remainder from the division of x by N.

There can be two or more slot formats for the SL transmission. For example, a first slot format includes symbols for transmission of TI and TG and remaining symbols of a slot having the first format are used for SL transmissions that can include PSCCH/PSSCH and/or PSFCH and a second slot format includes only symbols for transmission of PSCCH/PSSCH and/or PSFCH. An initial SL transmission from a UE on a SL sub-channel can use the first slot format and subsequent SL transmissions from the UE on the SL sub-channel use the second slot format.

A SL transmission can span one or multiple slots.

A transmission on the SL can be preceded by AGC tuning symbols and followed by switching gap symbols. In a variant, symbols can serve as switch gap symbols following a SL transmission and as AGC tuning symbols for a following SL transmission.

A TI, a corresponding TG, and a corresponding SL transmission resource can be configured to be in a same slot as illustrated in FIG. 5 and FIG. 6. Alternatively, a TI, a corresponding TG, and a corresponding SL transmission can be configured to be in different slots as illustrated in FIGS. 16A-16C.

Figure 16A:
FIGS. 16A, 16B and 16C illustrate a TI, a corresponding TG, and a corresponding SL transmission configured to be in different slots according to embodiments of the present disclosure.
Figure 16B:
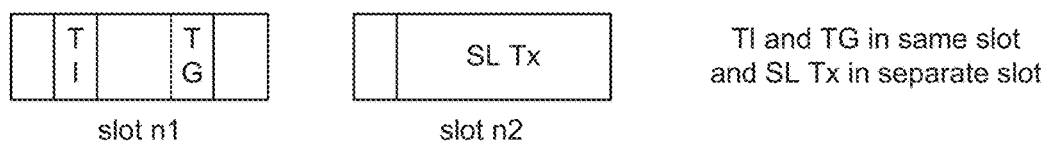
Figure 16C:
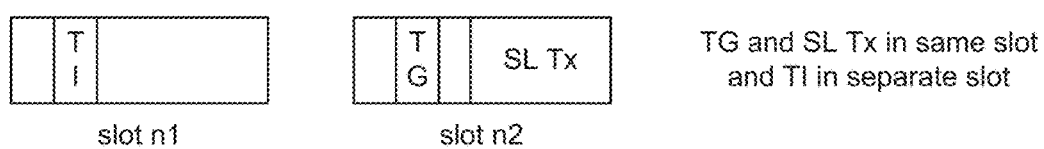

- A TI, a corresponding TG and a corresponding SL transmission can each be configured to be in a different slot as illustrated in FIG. 16A.
- A TI and a corresponding TG can be configured to be transmitted in a same slot, and a corresponding SL transmission can be configured to be in a different slot as illustrated in FIG. 16B.
- A TG and a corresponding SL transmission can be configured to be in a same slot, and a corresponding TI transmission can be configured to be in a different slot as illustrated in FIG. 16C.

Figure 17A:
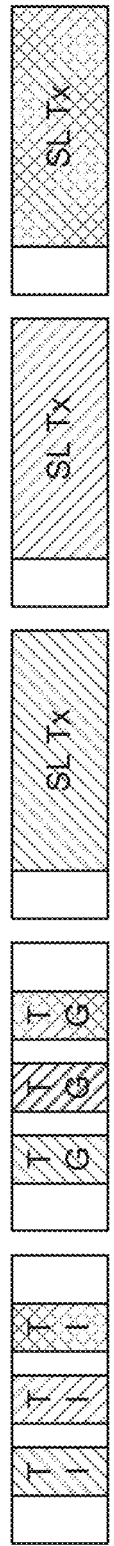
FIGS. 17A-17B illustrate a slot configured to have one or more TI resources in time and/or frequency and/or code domains to correspond to SL transmission resources in one or more slots according to embodiments of the present disclosure.
Figure 17B:
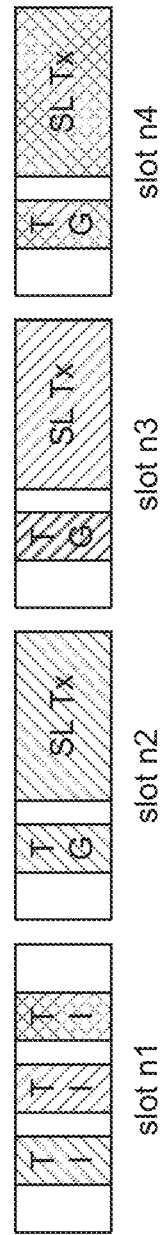

A slot can be configured to have one or more TI resources in time and/or frequency and/or code domains to correspond to SL transmission resources in one or more slots as illustrated in the examples of FIG. 17A and FIG. 17B.

A slot can be configured to have one or more TG resources in time and/or frequency and/or code domains to correspond to SL transmission resources in one or more slots as illustrated in FIG. 17A.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A first user equipment (UE) in a wireless communication system, the first UE comprising:
   a processor: and
   a transceiver operably coupled to the processor, the transceiver configured to:
      receive, from a second UE, an indication including information about at least one reserved resource for a sidelink transmission; and
      transmit, to the second UE, information related to a conflict for the at least one reserved resource,
   wherein the information related to the conflict for the at least one reserved resource is transmitted in a physical sidelink feedback channel (PFSCH), and
   wherein a resource for the PSFCH is identified based on an identity of the first UE.

2. The first UE of claim 1, wherein the information related to the conflict for the at least one reserved resource is identified based on whether a half-duplex operation of the first UE restricts reception in a slot of the at least one reserved resource.

3. The first UE of claim 1, wherein:
   the information related to the conflict for the at least one reserved resource is identified based on whether a first reserved resource and a second reserved resource overlap in time and frequency of the at least one reserved resource, the first reserved resource is indicated by the second UE, and the second reserved resource is indicated by a third UE.

4. The first UE of claim 1, wherein a channel conveying the information related to the conflict for the at least one reserved resource is associated with a channel conveying the indication.

5. The first UE of claim 1, wherein a resource for transmitting the information related to the conflict for the at least one reserved resource is identified based on the at least one reserved resource.

6. The first UE of claim 1, wherein the indication including the information about the at least one reserved resource is included in sidelink control information (SCI) and received in a physical sidelink control channel (PSCCH).

7. A second user equipment (UE) in a wireless communication system, the second UE comprising:

a processor: and a transceiver operably coupled to the processor, the transceiver configured to:

transmit, to a first UE, an indication including information about at least one reserved resource for a sidelink transmission; and receive, from the first UE, information related to a conflict for the at least one reserved resource, wherein the information related to the conflict for the at least one reserved resource is received in a physical sidelink feedback channel (PSFCH), and wherein a resource for the PSFCH is identified based on an identity of the first UE.

8. The second UE of claim 7, wherein the information related to the conflict for the at least one reserved resource is identified based on whether a half-duplex operation of the first UE restricts reception in a slot of the at least one reserved resource.

9. The second UE of claim 7, wherein:

the information related to the conflict for the at least one reserved resource is identified based on whether a first reserved resource and a second reserved resource overlap in time and frequency of the at least one reserved resource, the first reserved resource is indicated by the second UE, and the second reserved resource is indicated by a third UE.

10. The second UE of claim 7, wherein a channel conveying the information related to the conflict for the at least one reserved resource is associated with a channel conveying the indication.

11. The second UE of claim 7, wherein a resource for receiving the information related to the conflict for the at least one reserved resource is identified based on the at least one reserved resource.

12. The second UE of claim 7, wherein the indication including the information about the at least one reserved resource is included in sidelink control information (SCI) and transmitted in a physical sidelink control channel (PSCCH).

13. A method performed by a first user equipment (UE) in a wireless communication system, the method comprising:

receiving, from a second UE, an indication including information about at least one reserved resource for a sidelink transmission, and transmitting, to the second UE, information related to a conflict for the at least one reserved resource, wherein the information related to the conflict for the at least one reserved resource is transmitted in a physical sidelink feedback channel (PSFCH), and wherein a resource for the PSFCH is identified based on an identity of the first UE.

14. The method of claim 13, wherein the information related to the conflict for the at least one reserved resource is identified based on whether a half-duplex operation of the first UE restricts reception in a slot of the at least one reserved resource.

15. The method of claim 13, wherein:

the information related to the conflict for the at least one reserved resource is identified based on whether a first reserved resource and a second reserved resource overlap in time and frequency of the at least one reserved resource, the first reserved resource is indicated by the second UE, and the second reserved resource is indicated by a third UE.

16. The method of claim 13, wherein a channel conveying the information related to the conflict for the at least one reserved resource is associated with a channel conveying the indication.

17. The method of claim 13, wherein a resource for transmitting the information related to the conflict for the at least one reserved resource is identified based on the at least one reserved resource.

18. The method of claim 13, wherein the indication including the information about the at least one reserved resource is included in sidelink control information (SCI) and received in a physical sidelink control channel (PSCCH).

* * * * *